Figure 1:
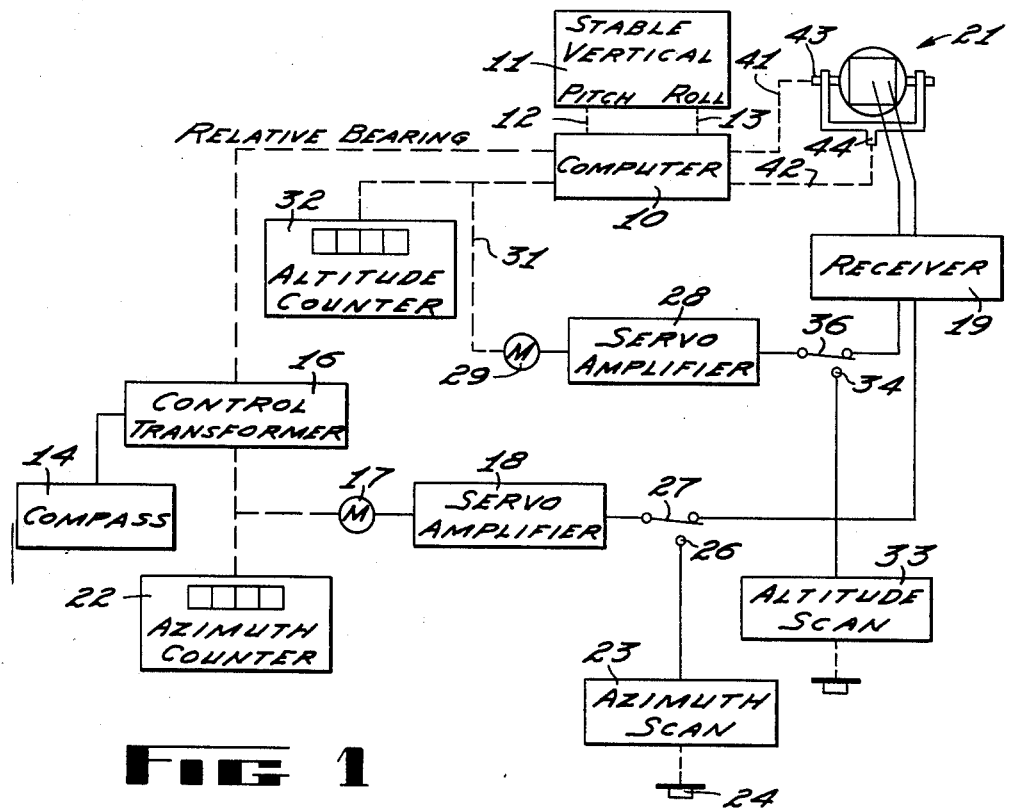

Aug. 2, 1960  G. R. MARNER ET AL  2,947,986
RADIOMETRIC SEXTANT STABILIZATION SYSTEM
Filed Feb. 5, 1954  6 Sheets-Sheet 1

INVENTOR.
GENE R. MARNER
RICHARD M. RINGOEN
BY
Marvin Moody
ATTORNEY

Aug. 2, 1960    G. R. MARNER ET AL    2,947,986
RADIOMETRIC SEXTANT STABILIZATION SYSTEM
Filed Feb. 5, 1954    6 Sheets-Sheet 2
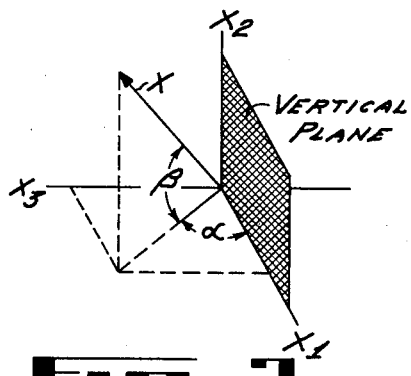
FIG 2
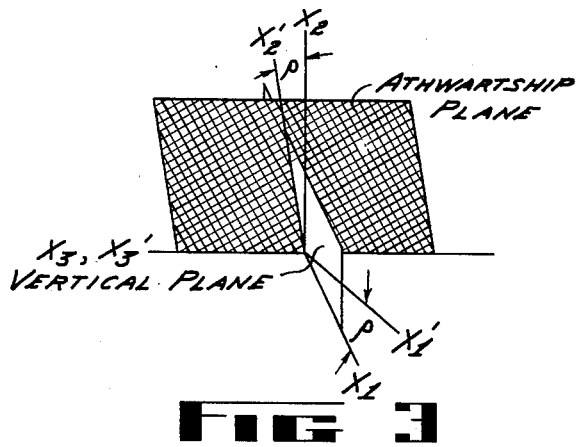
FIG 3
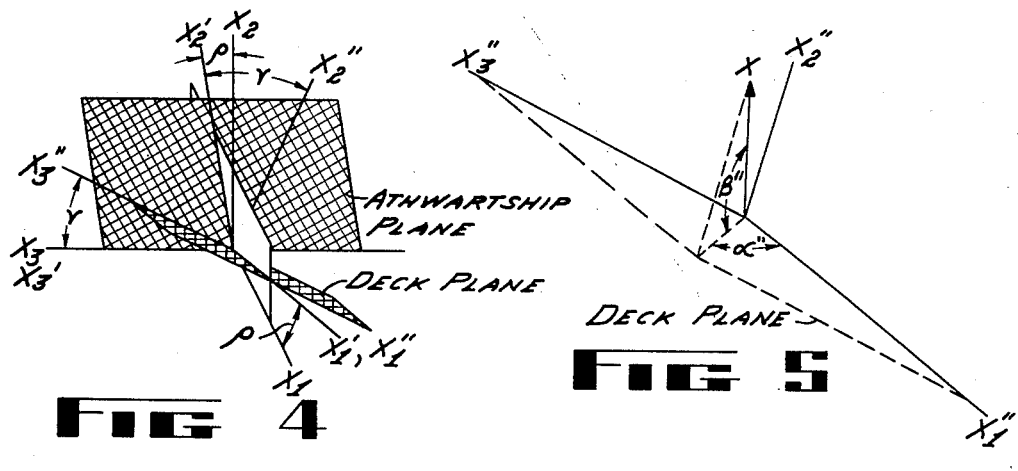
FIG 4
FIG 5
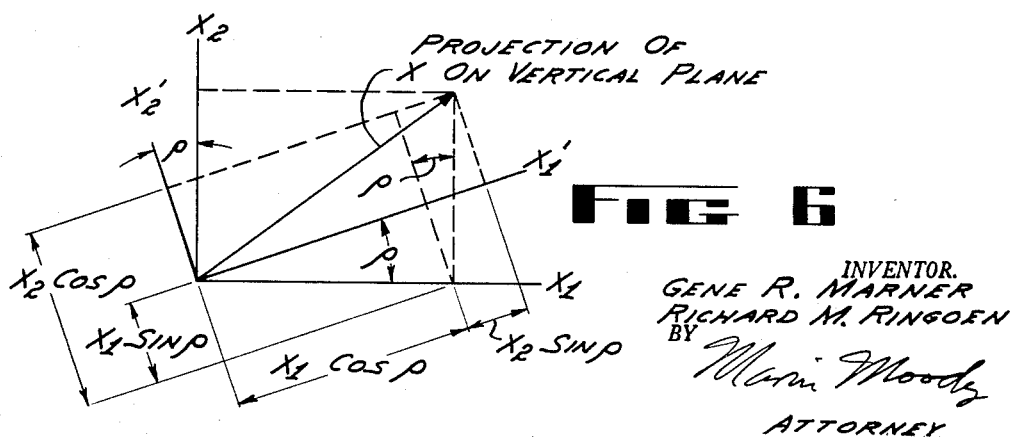
FIG 6
INVENTOR.
GENE R. MARNER
RICHARD M. RINGOEN
BY
Marvin Moody
ATTORNEY

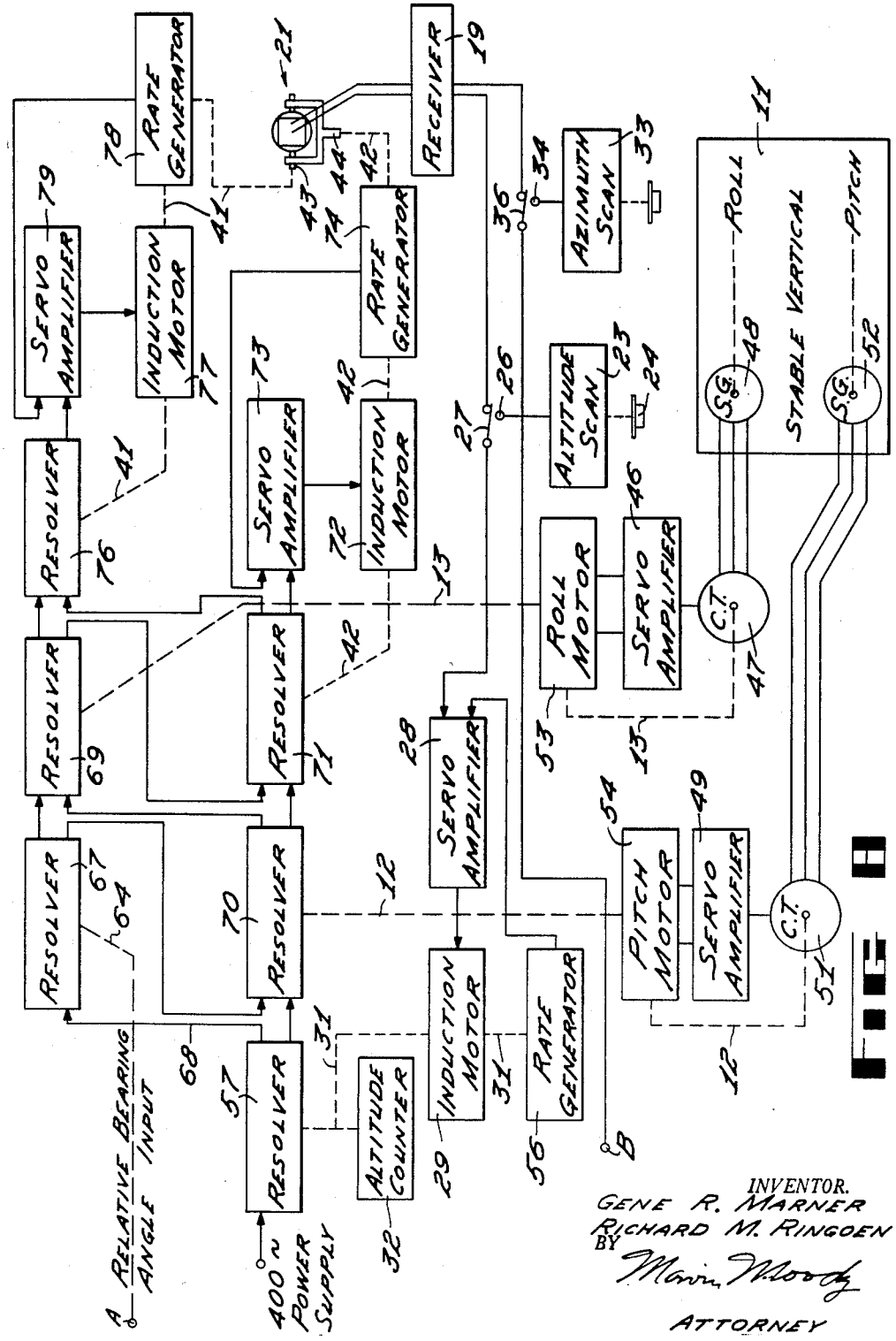

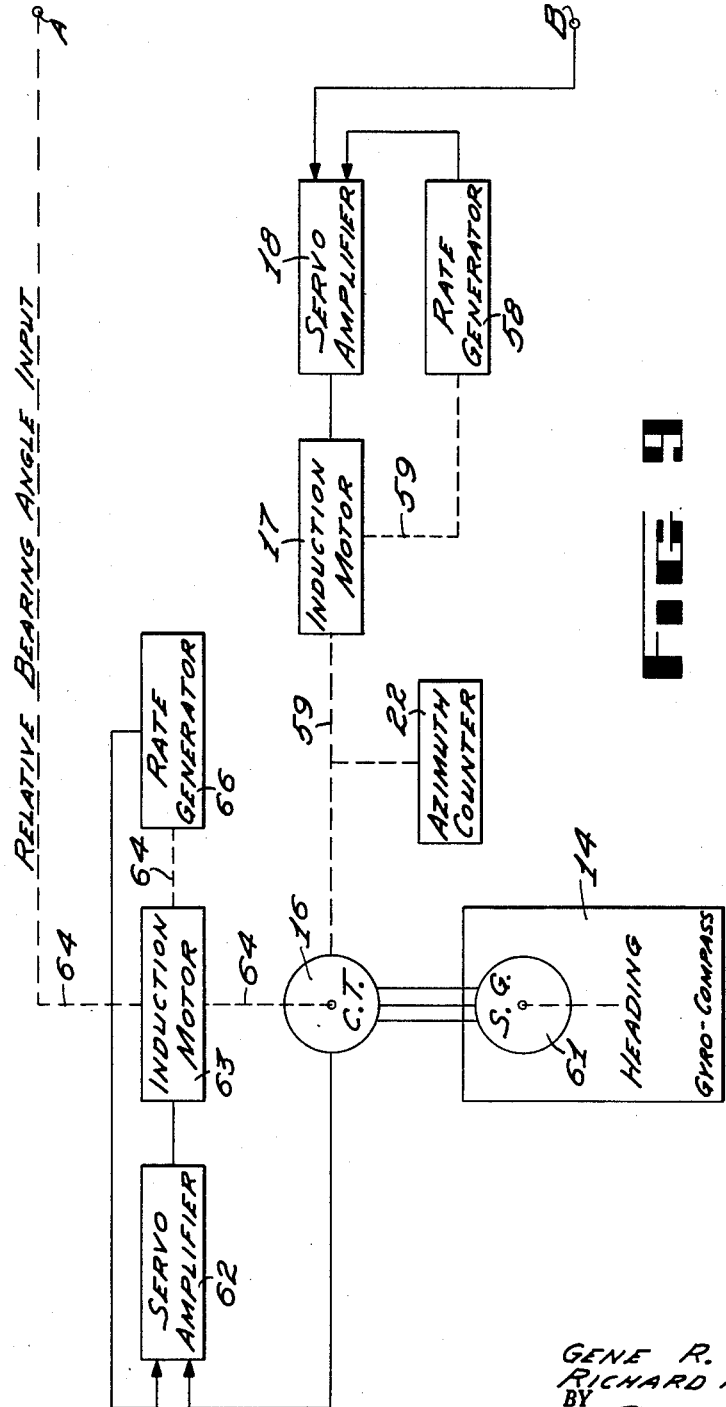

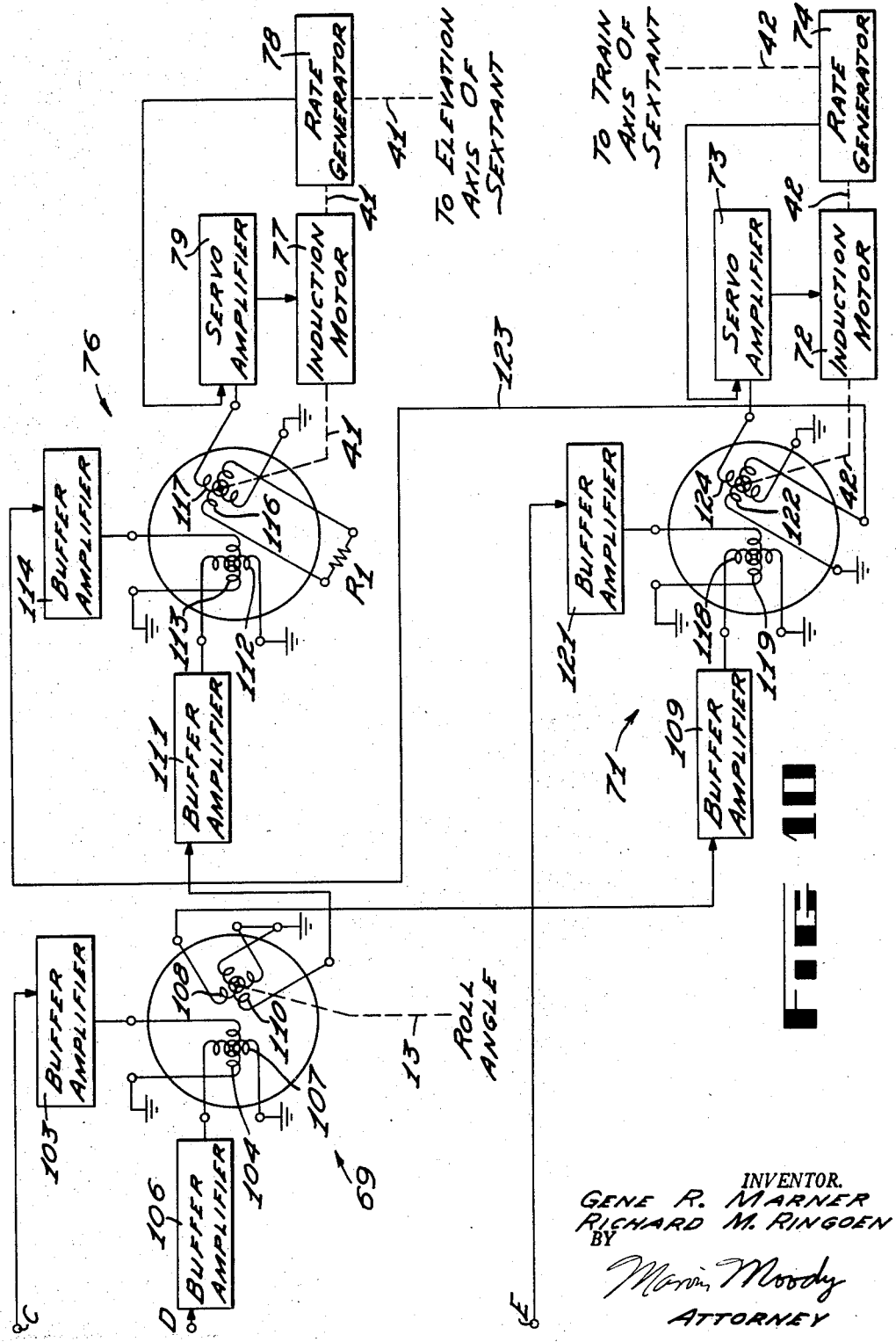

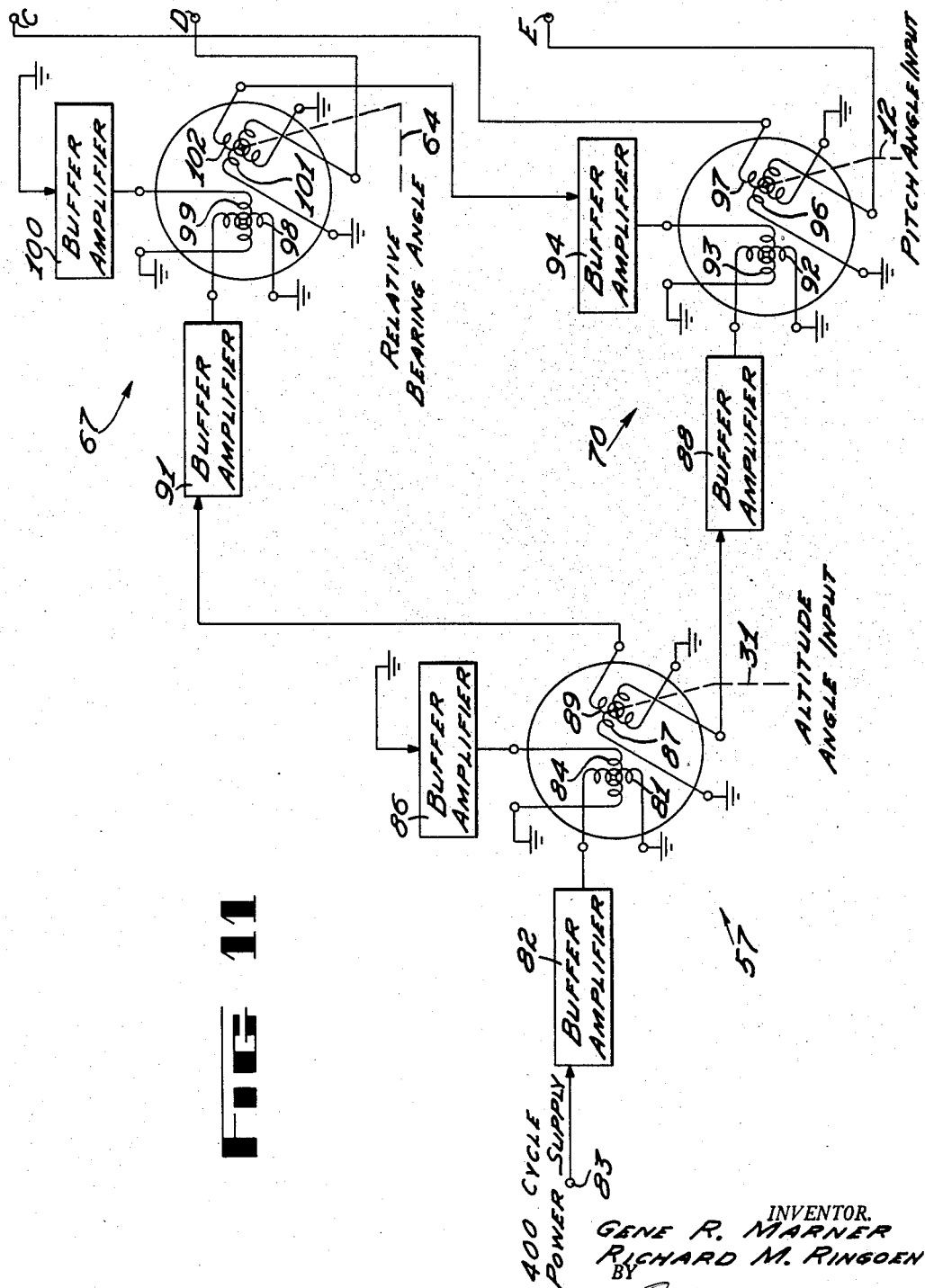

United States Patent Office 2,947,986
Patented Aug. 2, 1960

2,947,986
RADIOMETRIC SEXTANT STABILIZATION SYSTEM

Gene R. Marner, Iowa City, and Richard M. Ringoen, Cedar Rapids, Iowa, assignors to Collins Radio Company, Cedar Rapids, Iowa, a corporation of Iowa Filed Feb. 5, 1954, Ser. No. 408,386

10 Claims. (Cl. 343—117)

This invention relates in general to stabilizing means and in particular to means for stabilizing a tracking mechanism mounted on a moving platform.

Oftentimes it is desired to maintain an apparatus in a certain orientation relative to an inertial coordinate system despite the pitch, roll and yaw of the vessel on which it is mounted. An example of this situation occurs when aiming the guns of an aircraft or ship. Another example is in the use of a radiometric sextant such as described in the abandoned patent application Serial Number 121,126, filed October 13, 1949, and entitled "Radiating Body Tracker," wherein an apparatus detects microwave energy radiating from the sun or other celestial object and continuously tracks the object. If the sextant is mounted on a horizontal platform the angular positions of the two axes which support the tracking antenna are the relative bearing and altitude of the celestial object being tracked. With the aid of a north reference furnished by the vessel's compass, the azimuth of the celestial object can be computed from the relative bearing. Thus, with the knowledge of the azimuth and altitude of the celestial object a navigational fix may be obtained. If the platform on which the sextant is mounted is not horizontal but is pitching, rolling and yawing, the angular positions of the antenna mount axes will not be the relative bearing and altitude, but rather the train and elevation angles, which do not yield a navigational fix. Furthermore, in the case of the radiometric sextant the incoming signal from the celestial object is weak and contains fluctuations in power so that it is necessary to integrate the signal over a time which happens to be of the same order of magnitude as the period of the pitch and roll of typical vessels in order to obtain error voltages to track. Thus, the motion of the vessel would make it impossible to track the celestial body.

A conventional stabilized platform which utilizes gyros to maintain a platform in a level position can be used to overcome these difficulties. However, in some applications there are several objections to this arrangement because this means that four axes are being used to mount the complete structure, whereas only two should be needed to point a device in the direction defined by a given relative bearing and altitude.

It is an object of this invention to provide a computer which allows the use of a two-axis mount in place of the conventional four-axis mount by keeping a device in a desired orientation with respect to an inertial coordinate system despite the movements of the vessel on which the device is mounted.

Another object of this invention is to provide a means of computing and presenting the altitude and azimuth which define the orientation of a device with respect to an inertial coordinate system despite the movements of the vessel on which the device is mounted.

Another object of this invention is to provide a means of computing and presenting the altitude and azimuth which define the orientation of a device with respect to an inertial coordinate system when said device is mounted on a two-axis mount on a moving vessel.

Yet another object of this invention is to produce a navigation instrument wherein a radiometric sextant or other tracking device and a stabilization computer may be operated together in a closed loop fashion so as to continuously indicate the geographic position of a moving vessel.

A feature of this invention is found in the provision for an automatic tracking mechanism, as for example, a radiometric sextant, which supplies an input to a computer that also receives inputs from various relative motion measuring instruments and computes control signals for train and elevation angle corrections of the tracking mechanism.

Figure 7:
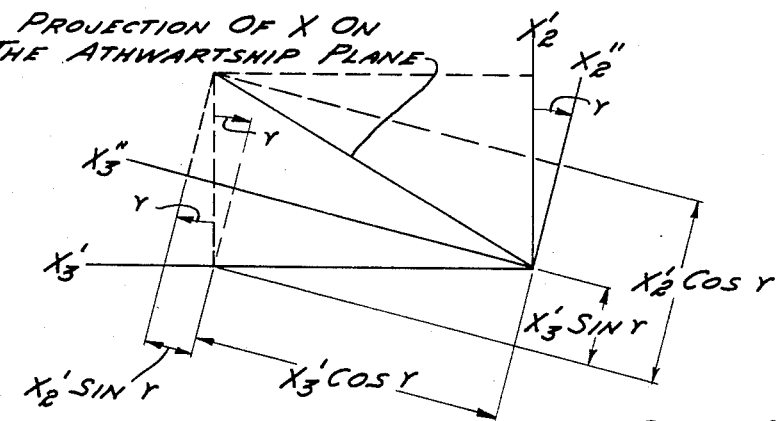

Further objects, features and advantages of this invention will become apparent from the following description and claims when read in view of the drawings, in which:

Figure 1 illustrates generally the problem solved by the present apparatus;
Figure 2 illustrates the fixed coordinate system;
Figure 3 illustrates an intermediate coordinate system;
Figure 4 illustrates the relationship between the various coordinate systems;
Figure 5 illustrates the deck coordinate system;
Figure 6 illustrates the intermediate components;
Figure 7 illustrates the deck components;
Figure 8 illustrates a portion of the complete system of this invention;
Figure 9 illustrates the remainder of the system shown in Figure 8;
Figure 10 illustrates a portion of the computer of this invention; and
Figure 11 illustrates the remainder of the computer of this invention.

As pointed out in now abandoned patent application Serial Number 121,126, filed October 13, 1949, entitled "Radiating Body Tracker," a radiometric sextant is capable of automatically tracking a radiating body. If the tracking mechanism is mounted on a horizontal platform and orientated relative to true north, azimuth and elevation signals may be directly obtained. However, if the tracking mechanism is mounted on a rolling and pitching vessel, the motion of the vessel must be considered in making astronomical computations in that the rates of change caused by the ship's motion are very significant.

Therefore it is desirable to provide a computer which in effect adds the additional tracking rates necessitated by the pitch and roll of the vehicle to the azimuth and elevation rates of the sun for a fixed installation. It may also be necessary to carry the computation process one step further so as to systematically scan in altitude and relative bearing to locate the radiating target. This is true because if the train and elevation drive motors on the antenna mount are scanned directly and the mount is not stabilized the pitch and roll of the vehicle will cause the antenna to miss sections of the sky and pass other sections more than once. (Train and elevation are deck coordinates—train being the angle between the fore-and-aft line of the vehicle and the projection of the axis of the antenna beam on the deck plane. Elevation is the angle between the antenna beam and the deck plane.) Thus, if the pitch and roll angles were very large, such a scanning arrangement would be ineffective. It would be preferable to scan by using slow, continuous changes in azimuth and altitude with a computer that will find the corresponding values of train order and elevation order. Thus, there are three computational functions needed:

(1) Compute relative bearing from azimuth and compass data.

(2) Compute train order and elevation order when pitch, roll, relative bearing and altitude are supplied. If this is done continually the additional axis turning rates necessitated by pitch and roll will automatically be added to the normal tracking rates.

(3) Present the azimuth and altitude angles of the axis of the antenna to the operator when the pitch and roll positions of the antenna mount axes and the heading of the vessel are known.

We have found that all three of these functions can be preformed by a single computer if it operates in a closed loop fashion with a radiometric sextant as part of the loop. For example, Figure 1 illustrates in block diagram the essential parts of such a system. The azimuth, gyro follow-up and altitude scan motors produce input shaft positions that are supplied to the computer 10.

A stable vertical 11 produces pitch and roll shaft output positions that are supplied, respectively, by shafts 12 and 13 to the computer. A compass 14 supplies an input to a control transformer 16 whose stator position is set by motor 17. Motor 17 receives an electrical input from a servo amplifier 18 connected to the train order error output of a receiver 19 of the sextant designated generally as 21.

An azimuth counter 22 continually indicates the azimuth of the celestial body. An azimuth scan 23 which, for example, might be a voltage source that may be varied in amplitude by control knob 24, is connected to a contact 26 that may be engaged by switch 27 connected to the input of servo amplifier 18.

The rotor position of the control transformer 16 is a shaft position equal to relative bearing which is supplied to the computer 10. An elevation order error signal is also produced by the receiver 19 and is supplied to a servo amplifier 28 which is connected to an altitude motor 29 that has its output shaft 31 connected to the computer 10.

An altitude counter 32 continually indicates the altitude of the celestial body under consideration. An altitude scan 33 is connected to a terminal 34 and may be selectively connected by a switch 36 to the servo amplifier 28.

The computer 10 receives the four input shaft positions and produces a pair of output shaft positions labeled elevation order 41 and train order 42. The elevation axis 43 and train axis 44 of the mount of the radiometric sextant 21 are slaved to these computer output shafts as indicated. Such an apparatus operates in a closed loop fashion so that shafts 43 and 44 are adjusted in such a manner that the antenna points at the celestial body and counters 22 and 32 indicate the azimuth and altitude, respectively.

Thus, means are provided for a two-axis stabilization system which is capable of systematically scanning in the azimuth-altitude coordinate system and the radiometric sextant may be pointed in any desired direction in space despite the pitch and roll of the vessel. The computer 10 gives a continuous solution of the train order and elevation order so that the tracking rates and position changes resulting from pitch and roll of the vessel are added by the computer to the normal rates and position required to point at and track the celestial body. Finally, since the whole system operates as a closed loop, the azimuth and altitude shafts of the computer give the sun's position whenever the sextant is tracking the sun. It is to be noted that the computer 10 need not be mounted close to the radio sextant 21 which may be a practical advantage, as for example, in combat type aircraft or ships.

*The computer requirements*

The general requirements of the stabilization system have been formulated and the desired characteristics of the computer may now be established. The computer should continuously furnish shaft positions which represent the train order and elevation order when shaft positions representing the pitch, roll, relative bearing and altitude are furnished to it. The computation which the computer must perform can now be stated. The definition of several coordinate systems and angles will be necessary for this statement.

The "fixed coordinate system" is a right-hand orthogonal coordinate system $x_1$, $x_2$, $x_3$ (Figure 2). $x_1$ lies along the fore-and-aft line of the vessel when pitch and roll are zero, the positive direction being toward the bow. $x_3$ is perpendicular to $x_1$, the positive sense being taken toward the starboard. The $x_1$—$x_3$ plane is the horizontal plane. $x_2$ is perpendicular to the horizontal plane, the positive direction being taken toward the zenith. In this coordinate system a direction in space can be defined by the relative bearing $\alpha$ and the altitude $\beta$ of a unit vector $x$, or by the three components of $x$, $x_1$, $x_2$, $x_3$. For discussion of the computer it is assumed throughout that the heading of the vessel remains constant so that the relative bearing can be used to define a point on the celestial sphere. This actually will not be a restriction because the heading differential will adjust the relative bearing to the correct value when the vessel yaws. An "intermediate coordinate system" $x_1'$, $x_2'$, $x_3'$ is obtained when the bow of the vessel pitches upward through an angle $p$ about the $x_3$ axis (Figure 3). The $x_1'$ axis lies along the fore-and-aft line of the vessel, the $x_3'$ axis is the same as the $x_3$ axis and the $x_2'$ axis is perpendicular to both $x_1'$ and $x_3'$. The $x_2'$—$x_3'$ plane is the athwartship plane while the $x_1'$—$x_2'$ plane is a vertical plane, $x_2'$ having been rotated through an angle $p$ from $x_2$ in this plane. Finally, define a "deck coordinate system" $x_1''x_2''x_3''$ which is obtained by a roll about the fore-and-aft line $x_1'$ through an angle $r$, $r$ being taken as positive when the starboard side of the vessel is above the horizontal. All three cordinate systems are shown in Figure 4. In Figure 5 the deck coordinate system is shown again for the purpose of defining the train order and elevation order. The original vector $x$ is shown; in the fixed coordinate system it had the components $x_1$, $x_2$, $x_3$ and could be specified by the relative bearing $\alpha$ and the altitude $\beta$. In the deck coordinate system this same vector has the components $x_1''$, $x_2''$, $x_3''$ and can also be specified by the train order $\alpha''$ and the elevation order $\beta''$. As shown in Figure 5, $\beta''$ is measured upward from the deck plane in a plane perpendicular to the deck plane, while $\alpha''$ is the angle measured in the deck plane, between the $x_1''$ axis and the projection of $x$ in the deck plane. For the rest of the discussion it will be assumed that $x$ is parallel to the symmetry axis of the sextant antenna which is pointing toward the sun. $\alpha''$ and $\beta''$ are therefore the shaft positions of the two-axis sextant mount.

The task of the computer is now clear. It must give the shaft positions $\alpha''$ and $\beta''$ when the quantities $p$, $r$, $\alpha$ and $\beta$ are given to it. In closed loop operation, as previously stated, a computer which will do this will also give the values of $\alpha$ and $\beta$ which correspond to the antenna position $\alpha''$ and $\beta''$. In order to see what computation is necessary $\alpha''$ and $\beta''$ will be expressed as functions of $\alpha$ and $\beta$. This can be done most easily by finding the deck components $x_1''$, $x_2''$, $x_3''$ as a function of the fixed components $x_1$, $x_2$, $x_3$, and then replacing the components with the corresponding angles.

The vertical plane of Figure 3 is redrawn in the plane of the paper in Figure 6. With the aid of this figure it can be seen that the effect of the rotation about $x_3$ through the angle $p$ is to transform the components in the following manner:

$$x_1' = x_1 \cos p + x_2 \sin p \quad (1)$$

$$x_2' = -x_1 \sin p + x_2 \cos p \quad (2)$$

$$x_3' = x_3 \quad (3)$$

For further computation it is more convenient to express these three equations with the single matrix equation $$x' = Ax \quad (4)$$

where A is the rotation matrix $$A = \begin{Vmatrix} \cos p & \sin p & 0 \\ -\sin p & \cos p & 0 \\ 0 & 0 & 1 \end{Vmatrix} \quad (5)$$

The deck components can be expressed as functions of the intermediate components in a similar way by reference to Figure 7. Here the athwartship plane is drawn in the plane of the paper and the $x_1'$ and $x_1''$ axis extend upward perpendicular to the plane of the paper. The projection of $x$ on the athwartship plane is shown along with its components $x_2'$ and $x_3'$. From Figure 7 it follows that $$x_1'' = x_1' \quad (6)$$
$$x_2'' = x_2' \cos r - x_3' \sin r \quad (7)$$
$$x_3'' = x_2' \sin r + x_3' \cos r \quad (8)$$

or
$$x'' = Bx' \quad (9)$$
where
$$B = \begin{Vmatrix} 1 & 0 & 0 \\ 0 & \cos r & -\sin r \\ 0 & \sin r & \cos r \end{Vmatrix} \quad (10)$$

The deck components can now be expressed as functions of the fixed components by eliminating $x'$ from Equation 9 with the use of Equation 4. Thus $$x'' = Cx \quad (11)$$
where
$$C = BA = \begin{Vmatrix} \cos p & \sin p & 0 \\ -\sin p \cos r & \cos p \cos r & -\sin r \\ -\sin p \sin r & \cos p \sin r & \cos r \end{Vmatrix} \quad (12)$$

Writing out the individual components therefore yields $$x_1'' = x_1 \cos p + x_2 \sin p \quad (13)$$
$$x_2'' = -x_1 \sin p \cos r + x_2 \cos p \cos r - x_3 \sin r \quad (14)$$
$$x_3'' = -x_1 \sin p \sin r + x_2 \cos p \sin r + x_3 \cos r \quad (15)$$

The final step of the computation is to replace the components with the appropriate angles. Reference to Figure 2 will show that $$x_1 = \cos \alpha \cos \beta \quad (16)$$
$$x_2 = \sin \beta \quad (17)$$
$$x_3 = \sin \alpha \cos \beta \quad (18)$$

In similar fashion it can be seen from Figure 5 that $$x_1'' = \cos \alpha'' \cos \beta'' \quad (19)$$
$$x_2'' = \sin \beta'' \quad (20)$$
$$x_3'' = \sin \alpha'' \cos \beta'' \quad (21)$$

Division of Equation 21 by 19 and elimination of components gives $$\tan \alpha'' = \frac{-\cos \alpha \cos \beta \sin p \sin r + \sin \beta \cos p \sin r + \sin \alpha \cos \beta \cos r}{\cos \alpha \cos \beta \cos p + \sin \beta \sin p} \quad (22)$$

Likewise $\beta''$ is obtained by eliminating the components in Equation 14:

$$\sin \beta'' = (\sin \beta \cos p - \cos \alpha \cos \beta \sin p) \cos r - \sin \alpha \cos \beta \sin r \quad (23)$$

Equations 22 and 23 are explicit statements of the computational processes which must be performed by the computer. The computation must be continuous and must be done with a precision compatible with that of the sextant.

Thus the computer 10 shown in Figure 1 will compensate for the pitch and roll of the ship if it solves Equations 22 and 23 for $\alpha''$ and $\beta''$. Herein disclosed is an electromechanical solution of Equations 22 and 23. Electromechanical two-phase resolvers are used because they offer the simplest, most direct way of computing components of a vector, the transformation of these components under coordinate rotation and the angles which correspond to these new components. Such resolvers are well known to those skilled in the art and for a more complete description see the patent to Agins #2,465,624, "Computer Device for Solving Trigonometric Problems" which issued on March 29, 1949.

Figures 8 and 9 illustrate the system shown in Figure 1 in more detail wherein various elements of the computer 10 are shown.

With reference to Figure 8, it is to be noted that the stable vertical 11 which might be gyro controlled, produces a roll output that is supplied by a synchro generator 48 that is in turn connected to a control transformer 47 which is connected to shaft 13. Control transformer 47 is connected to a servo amplifier 46. A pitch output from synchro generator 52 is connected to control transformer 51 which is in turn connected to servo amplifier 49. A pitch motor 54 is electrically connected to servo amplifier 49 and has an output shaft 12 that gives the pitch angle. Shaft 12 is connected to control transformer 51.

A roll motor 53 receives an electrical input from the servo amplifier 46 and has an output shaft 13 whose position is equal to the roll angle of the craft.

The elevation order error signal from the receiver 19 is fed to a servo amplifier 28. Amplifier 28 also receives an electrical input from a rate generator 56 that has its input shaft 31 connected to the output shaft of an induction motor 29. The amplifier 28 supplies an input to motor 29.

The output shaft 31 of the induction motor 29 is connected to the altitude counter 32 and to a first resolver 57.

The train order error signal from receiver 19 is connected to a terminal B which is shown in Figures 8 and 9. As shown in Figure 9, terminal B connects to a servo amplifier 18 which is in turn connected to an induction motor 17.

A rate generator 58 is driven by the output shaft 59 of motor 17. Generator 58 supplies an electrical input to the servo amplifier 18. The output shaft 59 is also connected to the stator of a control transformer 16 and an azimuth counter 22.

The gyro compass 14 supplies an electrical input to a synchro generator 61 which is electrically connected to the control transformer 16. Control transformer 16 supplies an electrical input to a servo amplifier 62 which is electrically connected to an induction motor 63 whose output shaft 64 is connected, respectively, to the control transformer 16 and a rate generator 66. Rate generator 66 supplies an electrical input to servo amplifier 62.

The position of shaft 64 is equal to the relative bearing angle and is terminated at point A in Figure 9. Point A is shown in Figure 8 and shaft 64 is connected to a resolver 67 which receives an electrical input by lead 68 from resolver 57.

Resolver 67 supplies electrical inputs to third and fourth resolvers 69 and 70, respectively. Resolver 70 also receives an electrical input from resolver 57. Shaft 12 is equal to the pitch angle from pitch motor 54 and is also connected to resolver 70.

The resolver 69 receives an electrical input from the resolver 70. Shaft 13 equal to the roll angle is also connected to resolver 69.

A fifth resolver 71 receives electrical inputs from resolvers 69 and 70. A shaft 42 equal to the train angle is also connected to resolver 71. Shaft 42 is connected to an induction motor 72 which receives an electrical input from servo amplifier 73.

Servo amplifier 73 receives inputs from the resolver 71 and a rate generator 74 which is driven by output shaft 42 of the induction motor 72.

Shaft 42 of the induction motor is also the train angle shaft which controls the train axis 44 of the radio sextant 21.

A sixth resolver 76 receives electrical inputs from resolvers 69 and 71. Shaft 41 equal to the elevation order angle from an induction motor 77 is also connected to resolver 76. A rate generator 78 is attached to shaft 41 and is driven by the motor 77. A servo amplifier 79 receives electrical inputs from resolver 76 and the rate generator 78 and supplies an electrical input to the induction motor 77.

The output shaft 41 of the motor 77 is connected to the elevation axis 43 of the radio sextant 21. The resolvers 57, 67, 69, 70, 71 and 76 are shown in more detail in Figures 10 and 11.

Figures 8 and 9 disclose a complete system and Figures 10 and 11 illustrate in detail the interconnections between the various resolvers.

Figures 10 and 11 illustrate in detail the resolvers and their interconnections. The resolvers shown have two-phase stators and two-phase rotors. The stator windings are displaced ninety degrees relative to each other as are the rotor windings. With reference to Figure 11, the resolver 57 has a first stator winding 81 that is connected to a buffer amplifier 82 which receives an input from a 400 cycle power supply, for example, that is connected to terminal 83. The other stator winding 84 is connected to a buffer amplifier 86 which has its other side connected to ground.

The rotor of the resolver 57 is controlled by the altitude angle shaft 31 and a first rotor winding 87 is connected to the input of a buffer amplifier 88 that supplies an input to the resolver 70.

The second rotor winding 89 is connected to a buffer amplifier 91 which supplies an input to the resolver 67. The buffer amplifier 88 is connected to a first stator winding 92 of the resolver 70 which has its opposite end grounded.

The other stator winding 93 has one end grounded and the other end is connected to a buffer amplifier 94.

The rotor of the resolver 70 is controlled by the pitch angle shaft 12 and has a first winding 96 which has one end grounded and the other end connected to a terminal E. The other rotor winding 97 has one end grounded and is connected to a terminal C.

The resolver 67 has its first stator winding 98 connected to the buffer amplifier 91 and the opposite side is connected to ground. The second stator winding 99 has one end grounded and the other end connected to a buffer amplifier 100. The opposite side of the buffer amplifier 100 is connected to ground. The rotor of the resolver 67 is controlled by the relative bearing angle shaft 64 and has a first winding 101 which has one side grounded and the other side connected to a terminal D. The other rotor winding 102 has one side grounded and the other side connected to the input of the buffer amplifier 94 of the resolver 70.

Terminals C, D and E are shown in Figure 10 and it is to be observed that terminal C is connected to a buffer amplifier 103 which has its output connected to one of the stator windings 104 of the resolver 69. Likewise, terminal D is connected to a buffer amplifier 106 which has its output connected to a second stator winding 107 of resolver 69.

The rotor of the resolver 69 is controlled by the roll angle shaft 13 and has a first winding 108 that has one side grounded and the other side connected to a buffer amplifier 109 of resolver 71. The second stator winding 110 of resolver 69 has one side grounded and is connected to buffer amplifier 111 of resolver 76.

The first stator winding 112 of resolver 76 is connected to the output of buffer amplifier 111 and has its opposite side connected to ground. The second stator winding 113 is also grounded and has its other side connected to a buffer amplifier 114.

The rotor of the resolver 76 is controlled by the elevation angle shaft 41 and has a first winding 116 which has a resistor $R_1$ connected across its terminals. The other winding 117 has one side grounded and the other side connected to the servo amplifier 79 previously described.

The resolver 71 has its first stator winding 118 connected to the output of the buffer amplifier 109 and its opposite side to ground. The second stator winding 119 has one side grounded and the other side connected to a buffer amplifier 121 which receives an input from terminal E. The rotor of resolver 71 is controlled by the train angle shaft 42. One of the rotor windings 122 has one side grounded and the other side connected to the buffer amplifier 114 by the lead 123. The other winding 124 of the resolver 71 is connected to the servo amplifier 73 previously described.

The computer described solves Equations 22 and 23 so that the altitude counter 32 and azimuth counter 22 continuously indicate the correct azimuth and altitude of the body being tracked. Since the system operates as a closed servo system, it will automatically compensate for pitch, roll and heading variations. The manner in which this is accomplished may be seen by a brief discussion of its operation.

If a unit voltage from the 400 cycle per second power supply is applied to the buffer amplifier 82, as shown in Figure 11, the rotor winding 87 delivers the voltage $\sin \beta$, which represents the component $x_2$ of a unit vector $x$ whose altitude angle is $\beta$, to amplifier 88. The other rotor winding, 89, produces the voltage $\cos \beta$. This represents the length of the projection of the unit vector on the horizontal plane $x_1-x_3$. This voltage is supplied to amplifier 91. When the rotor shaft of resolver 67 is set at the relative bearing $\alpha$, of the vector the outputs of windings 101 and 102 will be $x_3$ and $x_1$ respectively.

Thus the resolvers 57 and 67 compute the three rectangular components $x_1$, $x_2$, and $x_3$ of a unit vector defined by altitude $\beta$ and relative bearing $\alpha$, as shown in Figure 2. It will be recalled that these components are taken with reference to an inertial coordinate system so that they define a point on the celestial sphere when the heading of the vessel is specified.

Resolver 70 then computes the matrix multiplication of Equation 4, which is necessitated by the pitch of the vessel, the outputs of windings 96 and 97 being $x_1'$ and $x_2'$ respectively. Since $x_3$ is unchanged by the pitch the three intermediate components have now been obtained.

Resolver 69 (Figure 10) computes the effect of the matrix multiplication incurred by the roll of the vessel through an angle $\gamma$ about the fore-and-aft line. The voltages produced in the two output windings 110 and 108 are $x_2''$ and $x_3''$, as given by Equations 14 and 15. Since the component $x_1'$ is unchanged by the roll all three deck components of the unit vector have been obtained.

The final steps in the computation compute the angles $\alpha''$ and $\beta''$ which correspond to these three components. $\alpha''$ is the elevation angle and $\beta''$ is the train angle which the axes of the two-axis antenna mount must assume in order that the antenna be direct at the point on the celestial sphere defined by the altitude $\alpha$ and the relative bearing $\beta$. They are shown in Figure 5, and the connection between them and the deck components is given by Equations 19, 20, and 21. The angle $\alpha''$ is obtained by resolver 71. The voltage $x_1''$ is applied to amplifier 121 and the voltage $x_3''$ is applied to amplifier 109. Reference to Figure 5 will show that these are the components of the projection of $x$ on the deck plane. The shaft of resolver 71 is rotated by the induction motor 72 until a null voltage is obtained on winding 124. This operation corresponds to the rotation of the $x_1''$ and $x_3''$ axes about the $x_2''$ axis until the new $x_1''$ axis lies along this projection. The new $x_3''$ component is then zero, while the new $x_1''$ component is the entire length of the projection of $x$ on the deck plane. It is therefore evident that the rotation of the shaft until a null is obtained on winding 124 results in the shaft position $\alpha''$. The train axis is then slaved to this shaft.

The length of the projection cos $\beta''$, is represented by the voltage which appears on winding 122. This voltage is applied to amplifier 114. Amplifier 111 is supplied with the voltage $x_2''$, so that resolver 76 computes the elevation angle $\beta''$ by an analogous process. The rotor is driven by motor 77 until a null is obtained on winding 117. The other winding produces a voltage equal to the original length of the vector $x$, while the shaft assumes the angular position $\beta''$. The elevation axis of the antenna mount is then slaved to this shaft. Thus, when the shaft positions indicating the pitch and roll angles are available from a stable vertical, the antenna is directed continuously at a point on the celestial sphere defined by the altitude and relative bearing despite the pitching and rolling of the vessel.

The operation of the entire stabilization system is now clear. When switches 27 and 36 are thrown into the scanning position the azimuth scan and altitude scan units can cause the antenna to scan in altitude and azimuth in any manner desired. When the antenna is directed sufficiently close to the sun's position the receiver produces error voltages. The scanning switches are then thrown to the automatic tracking positions shown in Figure 1. The system is then in closed loop operation, error voltages actuating the altitude and azimuth drive motors after being amplified. The error signals will persist and continue to adjust the computer inputs until the antenna is pointing toward the center of the sun. In this closed loop operation the computer inputs have also become the desired outputs—the azimuth and altitude of the sun. These quantities are presented to the navigator by counters 22 and 32. When the deck is horizontal the two error signals will be approximately proportional to the displacement of the antenna axis from the center of the sun in azimuth and in altitude. When the deck deviates from horizontal the phase of the modulation of the received signal produced by conically scanning of the antenna will be shifted—the maximum angular shift being equal to the deck tilt. As long as this tilt angle does not exceed forty-five degrees, little effect on the stability of the tracking servos will be produced. Hench, these error signals may be used to drive the azimuth and altitude computer inputs without requiring converting the train and elevation order error signals to their azimuth and altiude equivalents.

This arrangement therefore satisfies all of the requirements for a two-axis stabilization system. Systematic scanning in the azimuth-altitude coordinate system can be carried out and the antenna can be pointed in any desired direction in space despite the pitch and roll of the vessel. The computer gives a continuous solution of the train order and elevation order so that the tracking rates which results from pitch and roll are added by the computer to the normal rates required to track the sun. Finally, since the whole system operates as a closed loop the azimuth and altitude shafts of the computer give the sun's position whenever the sextant is tracking the sun. It will be noted that the computer can be located in a position remote from the antenna site. Hence, this stabilization system would greatly reduce the size and weight of the portion of the unit needed at the antenna position. If the position were such that the stabilized vertical could also be removed from the antenna site, a still greater reduction in size and weight would be possible.

It is seen that this invention provides means for continually tracking a celestial body on a rolling and pitching craft.

Although it has been described with respect to a preferred embodiment thereof, it is not to be so limited as changes and modifications may be made therein which are within the full intended scope of the invention, as defined by the appended claims.

We claim:
1. A closed loop servo system for stabilizing a tracking mechanism mounted on a moving craft so that pitch, roll and yaw of the craft will not interfere with the accuracy of the tracking mechanism, comprising, a horizontal reference having a pair of output shafts positioned proportional respectively to the pitch and roll attitudes of the craft, said tracking mechanism mounted on train and elevation axes, first and second shafts connected respectively to the train and elevation axes of said tracking mechanism, an electromechanical analogue computer receiving inputs from said horizontal reference output shafts and having output shafts connected to said first and second tracking mechanism shafts, a heading reference device mounted on said craft, first and second servo motors receiving electrical outputs from said tracking mechanism proportional respectively to the elevation order error and train order error, said first servo motor supplying an output shaft position to said electro-mechanical computer, and a control transformer receiving an output from said second servo motor and an input from said heading reference device and supplying a shaft output to said electromechanical computer.

2. Apparatus for stabilizing a radiometric receiver of the type adapted to track a celestial body, said receiver mounted on train and elevation axes on a craft, comprising, an electromechanical analogue computer with a first output shaft connected to the elevation axis of said radiometric receiver mount and a second output shaft connected to the train axis of said radiometric receiver mount, said radiometric receiver producing a pair of electrical outputs respectively proportional to train order error and elevation order error, a first motor receiving said elevation order error output of the radiometic receiver and supplying an output shaft position to said computer, a second motor receiving the train order error output of said radiometric receiver, a control transformer receiving the shaft output of the second motor, a heading reference device mounted on said craft and supplying an input to said control transformer, said control transformer supplying a shaft position to said computer, and a stable vertical producing a pair of output shaft positions proportional respectively to the pitch and roll attitudes of said craft and supplying said output shaft positions to said computer whereby the shaft positions of said first and second motors are respectively proportional to the altiude and azimuth of the celestial body being tracked.

3. Apparatus for stabilizing a radiometric receiver of the type adapted to track a celestial body, said receiver mounted on train and elevation axes on a craft, comprising, an electromechanical analogue computer with a first output shaft connected to the elevation axis of said radiometric receiver mount and a second output shaft connected to the train axis of said radiometric receiver mount, said radiometric receiver producing a pair of electrical outputs respectively proportional to train order error and elevation order error, a first motor receiving said elevation order error output of the radiometric receiver and supplying an output shaft position to said computer, a second motor receiving the train order error output of said radiometric receiver, a control transformer receiving the shaft output of the second motor, a heading reference device mounted on said craft and supplying an input to said control transformer, said control transformer supplying a shaft position to said computer, and a stable vertical producing a pair of output shaft positions proportional respectively to the pitch and roll attitudes of said craft and supplying said output shaft positions to said computer, an altitude counter attached to the output shaft of said first motor and an azimuth counter attached to the output shaft of said second motor whereby said counters continuously indicate the altitude and azimuth of the celestial body being tracked.

4. Apparatus for stabilizing a tracking mechanism mounted on train and elevation axes on a moving craft comprising, a receiver mounted on said tracking mechanism and producing a pair of electrical outputs, a first motor receiving one of the electrical outputs from said receiver, an electromechanical analogue computer comprising a first resolver receiving a shaft input from said first motor, second and third resolvers receiving electrical inputs from the first resolver, said third resolver receiving an electrical input from said second resolver, a fourth resolver receiving electrical inputs from the second and third resolvers, a fifth resolver receiving inputs from the third and fourth resolvers, a sixth resolver receiving inputs from the fourth and fifth resolvers, a second motor receiving an input from the sixth resolver and furnishing a shaft input to the sixth resolver, the output shaft of the second motor connected to the elevation axis of said tracking mechanism, a third motor receiving an input from the fifth resolver, the output shaft of the third motor supplying an input to the fifth resolver and connected to the train axis of said tracking mechanism, a stable vertical external to said computer producing roll and pitch output shaft positions, the third resolver of said computer receiving the pitch shaft position from said stable vertical, the fourth resolver receiving the roll shaft position from the stable vertical, a relative bearing electromechanical differential system receiving the second electrical output of said receiver, a compass supplying an input to said relative bearing differential system, and the second resolver of said computer connected to the output shaft of said relative bearing differential system.

5. Apparatus for stabilizing a tracking mechanism mounted on train and elevation axes on a moving craft comprising, a receiver mounted on said tracking mechanism and producing a pair of electrical outputs, a first motor receiving one of the electrical outputs from said receiver, an electromechanical analogue computer comprising a first resolver receiving a shaft input from said first motor, second and third resolvers receiving electrical inputs from the first resolver, said third resolver receiving an electrical input from said second resolver, a fourth resolver receiving electrical inputs from the second and third resolvers, a fifth resolver receiving inputs from the third and fourth resolvers, a sixth resolver receiving inputs from the fourth and fifth resolvers, a second motor receiving an input from the sixth resolver and furnishing a shaft input to the sixth resolver, the output shaft of the second motor connected to the elevation axis of said tracking mechanism, a third motor receiving an input from the fifth resolver, the output shaft of the third motor supplying an input to the fifth resolver and connected to the train axis of said tracking mechanism, a stable vertical external to said computer producing roll and pitch output shaft positions, the third resolver of said computer receiving the pitch shaft position from said stable vertical, the fourth resolver receiving the roll shaft position from the stable vertical, a fourth motor receiving the second electrical output from said receiver, a compass mounted on the craft, a control transformer receiving an electrical input from said compass and connected to the output shaft of the fourth motor, a fifth motor connected electrically to the said control transformer, and the output shaft of the fifth motor connected to said control transformer and to the second resolver of said computer.

6. Apparatus for stabilizing a tracking mechanism mounted on train and elevation axes on a moving craft comprising, a receiver mounted on said tracking mechanism and producing a pair of electrical outputs, a first motor receiving one of the electrical outputs from said receiver, an electromechanical analogue computer comprising a first resolver receiving a shaft input from said first motor, second and third resolvers receiving electrical inputs from the first resolver, said third resolver receiving an electrical input from said second resolver, a fourth resolver receiving electrical inputs from the second and third resolvers, a fifth resolver receiving inputs from the third and fourth resolvers, a sixth resolver receiving inputs from the fourth and fifth resolvers, a second motor receiving an input from the sixth resolver and furnishing a shaft input to the sixth resolver, the output shaft of the second motor connected to the elevation axis of said tracking mechanism, a third motor receiving an input from the fifth resolver, the output shaft of the third motor supplying an input to the fifth resolver and connected to the train axis of said tracking mechanism, a stable vertical external to said computer producing roll and pitch output shaft positions, the third resolver of said computer receiving the pitch shaft position from said stable vertical, the fourth resolver receiving the roll shaft position from the stable vertical, a relative bearing electromechanical differential system receiving the second electrical output of said receiver, a compass supplying an input to said relative bearing differential system, the second resolver of said computer connected to the output shaft of said relative bearing differential system, and an altitude indicator connected to the output shaft of the first motor.

7. Apparatus for stabilizing a tracking mechanism mounted on train and elevation axes on a moving craft comprising, a receiver mounted on said tracking mechanism and producing a pair of electrical outputs, a first motor receiving one of the electrical outputs from said receiver, an electromechanical analogue computer comprising a first resolver receiving a shaft input from said first motor, second and third resolvers receiving electrical inputs from the first resolver, said third resolver receiving an electrical input from said second resolver, a fourth resolver receiving electrical inputs from the second and third resolvers, a fifth resolver receiving inputs from the third and fourth resolvers, a sixth resolver receiving inputs from the fourth and fifth resolvers, a second motor receiving an input from the sixth resolver and furnishing a shaft input to the sixth resolver, the output shaft of the second motor connected to the elevation axis of said tracking mechanism, a third motor receiving an input from the fifth resolver, the output shaft of the third motor supplying an input to the fifth resolver and connected to the train axis of said tracking mechanism, a stable vertical external to said computer producing roll and pitch output shaft positions, the third resolver of said computer receiving the pitch shaft position from said stable vertical, the fourth resolver receiving the roll shaft position from the stable vertical, a fourth motor receiving the second electrical output of said receiver, a control transformer connected to the output shaft of the fourth motor, a compass with its electrical output connected to the control transformer, a fifth motor receiving an electrical input from the control transformer and its output shaft connected to said control transformer and the second resolver of said computer, and an azimuth indicator connected to the output shaft of the fourth motor.

8. Apparatus for stabilizing a tracking mechanism mounted on train and elevation axes on a moving craft comprising, a receiver mounted on said tracking mechanism and producing a pair of electrical outputs, a first motor receiving one of the electrical outputs from said receiver, an electromechanical analogue computer comprising a first resolver receiving a shaft input from said first motor, second and third resolvers receiving electrical inputs from the first resolver, said third resolver receiving an electrical input from said second resolver, a fourth resolver receiving electrical inputs from the second and third resolvers, a fifth resolver receiving inputs from the third and fourth resolvers, a sixth resolver receiving inputs from the fourth and fifth resolvers, a second motor receiving an input from the sixth resolver and furnishing a shaft input to the sixth resolver, the output shaft of the second motor connected to the elevation axis of said tracking mechanism, a third motor receiving an input from the fifth resolver, the output shaft of the third motor supplying an input to the fifth resolver and connected to the train axis of said tracking mechanism, a stable vertical external to said computer, a roll motor of said computer receiving an input from said stable vertical, the fourth resolver connected to the output shaft of the roll motor, a relative bearing electromechanical differential system receiving the second electrical output of said receiver, a compass supplying an input to said relative bearing differential system, and the second resolver of said computer connected to the output shaft of said relative bearing differential system.

9. Apparatus for stabilizing a tracking mechanism mounted on train and elevation axes on a moving craft comprising, a receiver mounted on said tracking mechanism and producing a pair of electrical outputs, a first motor receiving one of the electrical outputs from said receiver, an electromechanical analogue computer comprising a first resolver receiving a shaft input from said first motor, second and third resolvers receiving electrical inputs from the first resolver, said third resolver receiving an electrical input from said second resolver, a fourth resolver receiving electrical inputs from the second and third resolvers, a fifth resolver receiving inputs from the third and fourth resolvers, a sixth resolver receiving inputs from the fourth and fifth resolvers, a second motor receiving an input from the sixth resolver and furnishing a shaft input to the sixth resolver, the output shaft of the second motor connected to the elevation axis of said tracking mechanism, a third motor receiving an input from the fifth resolver, the output shaft of the third motor supplying an input to the fifth resolver and connected to the train axis of said tracking mechanism, a stable vertical external to said computer, a pitch motor of said computer connected to the stable vertical and supplying a shaft input to the third resolver, a relative bearing electromechanical differential system receiving the second electrical output of said receiver, a compass supplying an input to said relative bearing differential system, and the second resolver of said computer connected to the output shaft of said relative bearing differential system.

10. Apparatus for stabilizing a tracking mechanism mounted on train and elevation axes on a moving craft comprising, a receiver mounted on said tracking mechanism and producing a pair of electrical outputs, a first motor receiving one of the electrical outputs from said receiver, an electromechanical analogue computer comprising a first resolver receiving a shaft input from said first motor, second and third resolvers receiving electrical inputs from the first resolver, said third resolver receiving an electrical input from said second resolver, a fourth resolver receiving electrical inputs from the second and third resolvers, a fifth resolver receiving inputs from the third and fourth resolvers, a sixth resolver receiving inputs from the fourth and fifth resolvers, a second motor receiving an input from the sixth resolver and furnishing a shaft input to the sixth resolver, the output shaft of the second motor connected to the elevation axis of said tracking mechanism, a third motor receiving an input from the fifth resolver, the output shaft of the third motor supplying an input to the fifth resolver and connected to the train axis of said tracking mechanism, a stable vertical external to said computer, a roll motor of said computer connected to the stable vertical and supplying a shaft position to the fourth resolver, a pitch motor of said computer connected to the stable vertical and supplying a shaft position to the third resolver, a relative bearing electromechanical differential system receiving the second electrical output of said receiver, a compass supplying an input to said relative bearing differential system, and the second resolver of said computer connected to the output shaft of said relative bearing differential.

References Cited in the file of this patent

UNITED STATES PATENTS

| | | |
|---|---|---|
| 1,926,251 | Mayrhauser | Sept. 12, 1933 |
| 2,480,208 | Alvarez | Aug. 30, 1949 |
| 2,604,698 | Ewing | July 29, 1952 |
| 2,649,264 | Slater et al. | Aug. 18, 1953 |
| 2,660,793 | Holschuh | Dec. 1, 1953 |
| 2,705,792 | Harris | Apr. 5, 1955 |
| 2,762,123 | Schultz et al. | Sept. 11, 1956 |